United States Patent
Vazana

Patent Number: 5,850,519
Date of Patent: Dec. 15, 1998

[54] COMPUTERIZED MAIL NOTIFICATION SYSTEM AND METHOD WHICH DETECTS CALLS FROM A MAIL SERVER

[75] Inventor: Shmuel Vazana, Rehovot, Israel

[73] Assignee: Rooster Ltd., Tel Aviv, Israel

[21] Appl. No.: 623,656

[22] Filed: Mar. 29, 1996

[30] Foreign Application Priority Data

Apr. 6, 1995 [IL] Israel ......................................... 113292
Feb. 7, 1996 [IL] Israel ......................................... 117072

[51] Int. Cl.$^6$ ........................... G06F 15/167; H04M 11/00
[52] U.S. Cl. ............................... 395/200.36; 395/200.34; 379/89
[58] Field of Search ......................... 395/200.01, 200.08, 395/200.34, 200.35, 200.36, 200.37; 379/67, 70, 88, 89, 96; 358/402

[56] References Cited

U.S. PATENT DOCUMENTS

| | | | |
|---|---|---|---|
| 4,837,798 | 6/1989 | Cohen et al. | 379/88 |
| 5,138,653 | 8/1992 | Le Clercq | 379/96 |
| 5,177,780 | 1/1993 | Kasper et al. | 379/59 |
| 5,293,250 | 3/1994 | Okumura et al. | 358/402 |
| 5,475,738 | 12/1995 | Penzias | 379/67 |
| 5,483,352 | 1/1996 | Fukuyama et al. | 358/402 |
| 5,530,740 | 6/1996 | Irribarren et al. | 379/89 |
| 5,548,753 | 8/1996 | Linstead et al. | 707/1 |
| 5,590,178 | 12/1996 | Murakami et al. | 395/200.3 |
| 5,632,018 | 5/1997 | Otorii | 379/93.18 |

Primary Examiner—Parshotam S. Lall
Assistant Examiner—Viet Vu
Attorney, Agent, or Firm—Wilson Sonsini Goodrich & Rosati

[57] ABSTRACT

An electronic mailing system having at least a main host computer, for transferring mail between a sending subscriber and a recipient subscriber is provided. The subscribers are not connected to each other or to the host computer. Messages are sent from one sender subscriber to another recipient subscriber via the host computer which stores mail addressed to subscribers in individual mailboxes. The host computer has a dialing unit connected to it for calling a phone associated with the recipient subscriber whenever a new message arrives at the host computer. The recipient has a receiving unit including a call intercepting unit associated with the recipient's phone for intercepting and identifying calls from the dialing unit and a display unit for displaying an indication that the dialing unit has called the call intercepting unit.

57 Claims, 6 Drawing Sheets

COMPUTERIZED MAIL NOTIFICATION SYSTEM AND METHOD WHICH DETECTS CALLS FROM A MAIL SERVER

FIELD OF THE INVENTION

The present invention relates to electronic mailing in general and more particularly to a method and system for notifying a destination terminal that mail is awaiting collection.

BACKGROUND OF THE INVENTION

Postal services throughout the world deliver mail either directly to each individual recipient's home address or to a central location for collection by the recipient. The central location is generally located adjacent to the area post office and commonly consist of numerous post office boxes, with one box being assigned to each recipient. The latter method of mail delivery is preferred by the postal service as it enables the postal service to deliver the mail more quickly and therefore at a cheaper cost, especially in areas where the population is widely spread.

The disadvantage of the post office box (POB) is the need for the recipient to go and retrieve the mail himself from the POB. The POBs are generally of a standard size and incapable of storing large amounts of mail. If the mail is not retrieved regularly, the box becomes full and any extra mail cannot be placed in the box and has to be held by the post office until the earlier mail has been removed. For the private user who only receives mail on an irregular basis, the trip to the POB may turn out to be a wasted journey if the POB is empty.

In addition to standard postal services, messages and mail can also be sent via electronic mailing systems.

Electronic mailing systems are used by computers to send mail and messages either through the telephone network or area network such as a LAN (local area network) or WAN (wide area network).

An example of the prior art electronic mailing system is shown in FIG. 1 which is a flow chart and block diagram illustrating the prior art system and operation of sending and receiving mail respectively, between non-connected locations.

For the purposes of this description, the initiator of a message is referred to as the sender and the addressee, that is, the person to whom the mail is addressed and who wishes to receive the mail is referred to as the recipient.

Generally, in order to send a message, a sender 10 uses a modem connected to a computer, generally designated 12, to dial a host computer, generally designated 14. Host computer 14 acts as a central transfer station for the movement of messages from the sender 10 to a recipient 16. Messages are not forwarded directly to recipient 16 but remain stored in host computer 14 until it is collected by recipient 16. Recipient 16 also needs to be connected to a modem and computer system, generally designated 18 in order to check whether any messages are waiting for him and to receive the messages.

The process of communication between sender 10 and recipient 16 via host computer 14 can be described as follows. Sender 10 dials host computer 14 (step 20), which after successfully identifying the sender (step 22), informs the sender whether there is mail for him (step 24). Generally, host computer 14 informs every caller (sender or recipient) at the time of initial connection to the computer, whether any mail addressed to him. Sender 10 can then transmit his message (step 26). Host computer 14 identifies the recipient (step 28) and stores the message (step 30) in the recipient's mailbox 31. Host computer 14 simultaneously updates the received mail status of the recipient (step 32).

To collect any mail or even to just check whether any mail has been received, recipient 16 needs to contact host computer 14 (step 34). As previously described with respect to sender 10, computer 14 first identifies the caller (step 22) and then checks the mail received status (step 24) and informs recipient 16 accordingly. Recipient 16 can then read any messages stored in his mailbox and if so desired can download them (step 36). After mail has been collected, host computer 14 resets the mail status of the recipients (step 32) to "no messages" status.

Voice messages may also be send via the telephone network using a Voice Mail (VM) system. Voice mail systems include means to identify and store voice messages. An individual user can connect his computer, via a card which can identify speech, to the telephone network and thereby receive messages. A subscriber can rent a voice mail box (VMB) from the telephone company. A VMB is similar to a POB but stores voice or speech messages instead of written mail. Callers to the subscriber's number can leave messages which are stored in the subscriber's VMB for later retrieval by him. The VMB subscriber needs to call his box in order to discover whether any messages have been received and to retrieve them.

Conventional post office boxes, electronic mailing systems and voice mail systems have the disadvantage that the recipient of a message is totally unaware that there is a message waiting for him. The recipient is required to periodically contact the POB, VMB or host computer just to check whether any mail awaits him.

SUMMARY OF THE INVENTION

It would be desirable to be able to provide an electronic mailing system and method which automatically notifies an intended recipient that there is mail awaiting his collection. It would also be desirable for the recipient to be able to receive notification of the urgency status of mail stored for him.

It would also be desirable to be able to provide a system for automatically notifying a person that mail has been deposited in his post office box and is awaiting collection. It would also be further desirable to provide a system for automatically notifying a person that there are voice mail or telephone messages requiring his attention.

According to the invention there is provided an electronic mailing system having at least a main host computer, for transferring mail between a sending subscriber and a recipient subscriber The subscribers are not connected to each other or to the host computer. Messages are sent from one sender subscriber to another recipient subscriber via the host computer which stores mail addressed to subscribers in individual mailboxes. The host computer has a dialing unit connected to it for calling a phone associated with the recipient subscriber whenever a new message arrives at the host computer. The recipient has a receiving unit including a call intercepting unit associated with the recipient's phone for intercepting and identifying calls from the dialing unit and a display unit for displaying an indication that the dialing unit has called the call intercepting unit.

According to a second embodiment of the invention there is provided an electronic mailing system having at least a main host computer, for transferring mail between a sending subscriber and a recipient subscriber. The host computer has a dialing unit connected to the host computer for calling a telephone number associated with the recipient subscriber whenever a mail message for the recipient subscriber arrives at the host computer. The recipient has a receiving unit which includes a modem communicator associated with the recipient subscriber's telephone for receiving the telephone call from the dialing unit; and a personal computer having a display unit for displaying an indication that the dialing unit has called the call intercept unit. The modem communicator includes a call intercept unit, for intercepting the telephone call from the dialing unit. The receiving unit also has a phone database for storing details associated with each of the calling telephone numbers.

Additionally, in accordance with a preferred embodiment of the present invention, the host computer includes a communications processor for processing information communicated to the host computer; a user database for storing details of subscribers to the host computer; and a mail control unit for processing mail messages communicated to the host computer. The mail control unit includes a plurality of mailboxes for storing of the received mail messages, each of the plurality of mailboxes allocated to one of the subscribers and a mail update unit for registering and updating the status of one of the mailboxes whenever a mail message is received or collected from the mailbox.

There is also provided in accordance with a preferred embodiment of the invention, a mail notification system for notifying an addressee subscriber that mail has been deposited in the addressee subscriber's mailbox which includes a processing unit, a dialing unit, a receiving unit and a display unit. The dialing unit is connected to the processing unit for calling a telephone number associated with the addressee subscriber whenever mail is deposited in his mailbox. The receiving unit includes a call intercept unit associated with the addressee subscriber's telephone, for intercepting the telephone call from the dialing unit. The display unit indicates when the dialing unit has called.

Furthermore, in accordance with a preferred embodiment of the invention, the mail notification system also includes a mail sorter, connected to the processing unit, for identifying and classifying mail addressed to the addressee subscriber.

Additionally, there is thus provided in accordance with a preferred embodiment of the invention, a mail notification system for notifying an addressee subscriber that mail has been deposited in said addressee subscriber's mailbox, which includes a processing unit connected to a sensing device, connected to the addressee subscriber's mailbox for sensing whenever mail is deposited in or removed from said addressee subscriber's mailbox.

Additionally, there is thus provided in accordance with a preferred embodiment of the invention, a mail notification system for notifying an addressee subscriber that mail has been deposited in said addressee subscriber's mail box, which includes a processing unit for processing the incoming mail, a dialing unit, a receiving unit including a modem communicator associated with the addressee subscriber's telephone for receiving the telephone call from the dialing unit and a computer system which includes a display unit.

Furthermore, in accordance with a preferred embodiment of the invention, the dialing unit is also connected to the processing unit for calling a telephone number associated with the addressee subscriber whenever mail is deposited in his mailbox and a receiving unit and a display unit. The receiving unit includes a call intercept unit associated with the addressee subscriber's telephone, for intercepting the dialed telephone call.

Furthermore, in accordance with a preferred embodiment of the invention, the mail notification system also includes a user database for storing details of mailbox subscribers and a mail control unit for registering and updating the status of the mailbox whenever mail is received or collected from the mailbox. The mail may be any type of mail such as postal or voice mail.

Additionally, in accordance with a preferred embodiment of the present invention, receiving unit further includes a phone database for storing details associated with each of the calling telephone numbers.

Furthermore, in accordance with a preferred embodiment of the present invention, the display unit may display an incrementing counter for displaying the number of calls received, an alphanumeric or light emitting diode display or the telephone number of the caller.

Furthermore, in accordance with a preferred embodiment of the present invention, the call intercept unit may be a paging receiver not directly connected to the recipient subscriber's telephone or a remote receiver.

Additionally, in accordance with a preferred embodiment of the present invention, the call intercept unit includes apparatus for processing data sent by the telephone network.

There is also provided in accordance with a preferred embodiment of the invention, a method for notifying a subscriber that mail has been deposited in said subscriber's mailbox. The method includes the steps of:

a. processing incoming mail;

b. depositing mail addressed to the subscriber in the subscriber's mailbox;

c. dialling a telephone number associated with the subscriber whenever mail is deposited in the subscriber's mailbox;

d. intercepting the dialled call by means of an unit associated with the subscriber's telephone; and e. displaying an indication that the dialled call has been intercepted.

Furthermore, in accordance with a preferred embodiment of the invention, the step of processing includes the step of sorting said incoming mail by identifying and classifying said mail and the step of sensing whenever there is a change in the amount mail deposited in the subscriber's mailbox.

Additionally, in accordance with a preferred embodiment of the invention, the method further includes the step of registering and updating the status of the subscriber's mailbox whenever a change is made in the amount of mail deposited in the subscriber's mailbox.

Furthermore, in accordance with a preferred embodiment of the invention, the step of intercepting includes the step of identifying said dialled call from a database storing details of telephone numbers.

Furthermore, in accordance with a preferred embodiment of the invention, the step of intercepting includes the step of processing data sent by the telephone network.

There is also provided in accordance with a preferred embodiment of the invention, a method for transferring mail between a sending subscriber and a recipient subscriber via a host computer. The sending and recipient subscribers are not continually connected to each other or to the host computer. The method includes the steps of:

a. dialling a telephone number associated with the recipient subscriber whenever a mail message for the recipient subscriber arrives at the host computer;

b. intercepting the dialled telephone call by means of an unit associated with the subscriber's telephone; and c. displaying an indication that the dialled call has been intercepted.

Furthermore, in accordance with a preferred embodiment of the invention, the step of intercepting includes the step of identifying the dialled call from a database storing details of telephone numbers.

Furthermore, in accordance with a preferred embodiment of the invention, the step of intercepting includes the step of processing data sent by the telephone network.

Additionally, in accordance with a preferred embodiment of the invention, the method for transferring mail further includes the steps of storing received messages within one of a plurality of mailboxes and registering and updating the status of mail messages received or collected from the mailboxes.

Furthermore, in accordance with a preferred embodiment of the invention, the step of displaying includes the step of displaying the number of calls received or the telephone number of the caller.

BRIEF DESCRIPTION OF THE DRAWINGS

These and further construction features of the invention will be better appreciated in the light of the ensuing description of a preferred embodiment thereof, given by way of example only with reference to the accompanying drawings wherein.

DETAILED DESCRIPTION OF A PREFERRED EMBODIMENT

Figure 2:
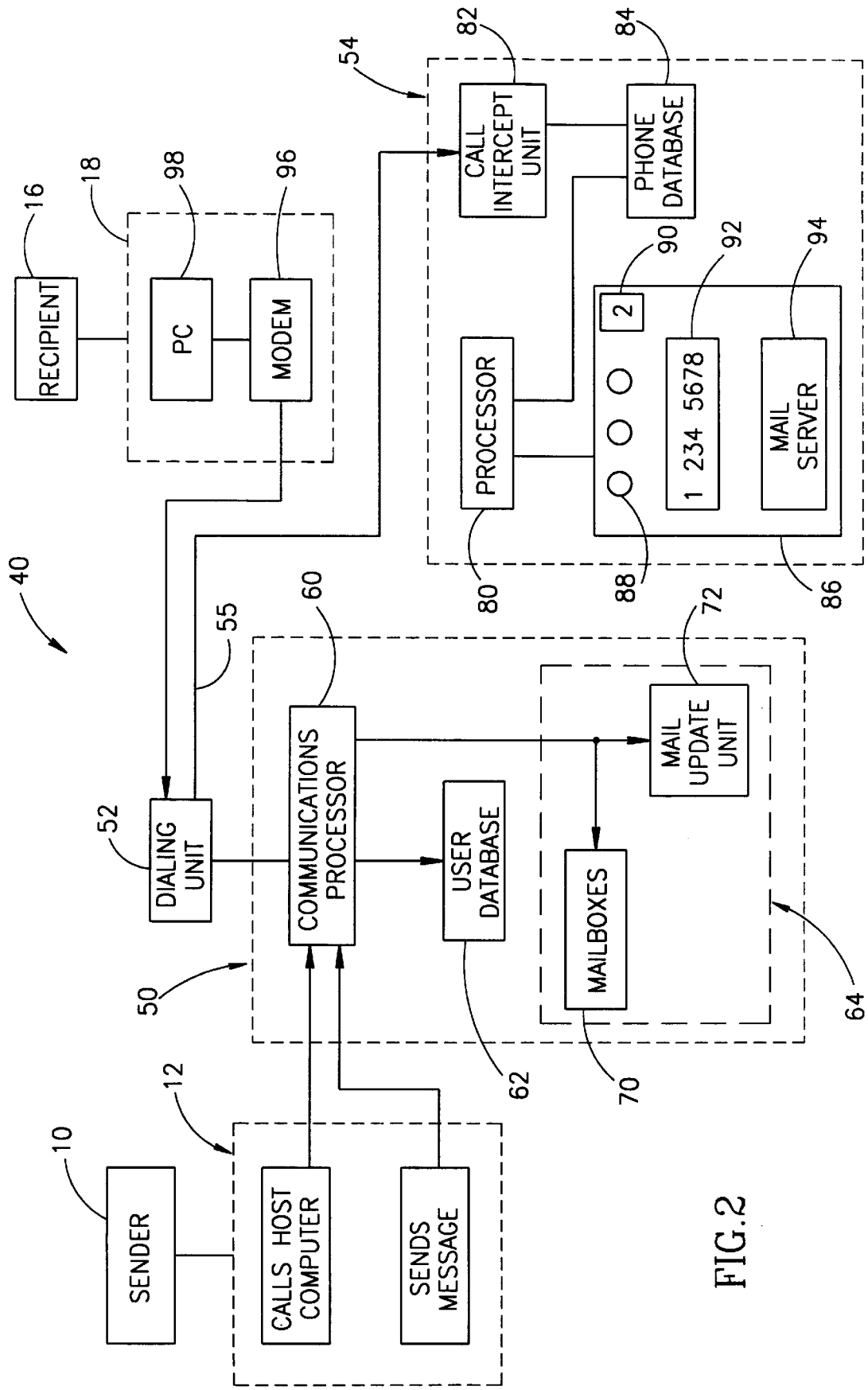
FIG. 2 is a block diagram illustration of an electronic mailing system in accordance with a preferred embodiment of the present invention.

Reference is now made to FIG. 2 which illustrates an electronic mailing system, generally designated 40, constructed and operative in accordance with a preferred embodiment of the invention.

Electronic mailing system 40 comprises a host computer, generally designated 50, a dialing unit 52 and a receiving unit 54. The sender 10 uses his computer 12 to contact host computer 50, as hereinabove described with reference to prior art system of FIG. 1. When a mail message is received by host computer 50, dialing unit 52, which is connected to host computer 50, dials the telephone number associated with the recipient via the public telephone network, shown by line 55. Receiving unit 54 is attached to the recipient's telephone line in order to intercept and identify calls made to the recipient.

Receiving unit 54 can also be configured to display an indication that host computer 50 has called. Receiving unit 54, which is generally located at a remote location from host computer 50, only needs to be connected to the public telephone network and does not need to be connected to the recipient's computer 18 in order for the recipient to receive notifications from the host computer 50 that there are mail messages awaiting collection.

Host computer 50 further comprises a communications processor 60, a user database 62 and a mail control unit 64. Communications processor 60 processes all information communicated to host computer 50 and identifies the sender and recipient by reference to a database of subscribers contained within user database 62. Communications related to mail messages are processed by mail control unit 64, which registers all mail being sent via host computer 50.

Whenever mail is received, mail control unit 64 retrieves details of the recipient's associated telephone number from user database 62 and passes the information on to dialing unit 52. Dialing unit 52 then dials the recipient's associated phone number. Receiving unit 54 intercepts the call, using the call intercept unit 82 (described hereinbelow), made by dialing unit 52 and after identifying the caller, displays an indication that dialing unit 52 has called the recipient. It will be appreciated that, in contrast to prior art systems, a subscriber, with the present invention, is not obliged to contact the host computer 50 just to check whether there is any mail for him.

Mail control unit 64 comprises a plurality of mailboxes 70 and a mail update unit 72. Received mail is stored in the recipient's mailbox which is one of the plurality of mailboxes 70. A separate mailbox is allocated to each subscriber. Mail update unit 72 registers and updates the status of mail received and collected. When a subscriber communicates with host computer 50 for whatever purpose, host computer 50 checks mail update unit 72 and informs the subscriber whether any mail awaits him.

Receiving unit 54 comprises a processor 80, a call intercept unit 82, a phone database 84 and a display unit 86.

Processor 80 controls the operation of receiving unit 54. Call intercept unit 82 intercepts the call made by dialing unit 52 and searches phone database 84 to identify the caller. Phone database 84 contains data, such as details of the host telephone and name and address of the calling phone, entered by the recipient to enable him to identify the calling phone.

Receiving unit 54, which is connected to telephone line 55, may also be connected to the recipient's computer system 18. The recipient's computer system 18 comprises a modem 96 connected to a computer, such as a personal computer (PC) 98. Modem 96, of a type known in the art, is connected to any telephone line and can also be connected to receiving unit 54, if desired.

In operation, whenever mail is received at the host computer 50, the recipient is identified, the message is stored in the appropriate mailbox 70 and mail update unit 72 is updated. Dialing unit 52 then dials the recipient's associated telephone number. If the phone call is identified as having been sent by dialing unit 52, display unit 86 indicates to the recipient that host computer 50 has contacted him. After a pre-determined number of unanswered rings, for example after three rings, dialing unit 52 terminates the dialing sequence. Since the recipient has not lifted the receiver in order to communicate with the sender, in contrast to traditional phone communications, host computer 50 has not incurred any dialing charges. Thus, at no expense to the caller (host computer 50), recipient 14 has received an indication that there is mail awaiting collection.

Call intercept unit 82, can be any type known in the art, such as the "Call Editor II" unit manufactured by VIVE Synergies Inc. of Ontario, Canada, identifies the number of the person making the call by interpreting a data stream sent by the telephone company. The data stream is transmitted, for example, in most states of the United States, between the first and second ring signals. In this case, call intercept unit 82 only intercepts the call after the second ring when the data stream has been sent.

One form of data stream, known as the 'short form stream', consists of null values followed by a two-byte prefix, date, time and number, including area code. A "longer" data stream can also be sent and could include, for example, in addition to the information in the 'short' stream, details of the name and directory information of the calling phone.

Display unit 86 can display the fact that dialing unit 52 has dialed the recipient by any suitable means, such as a LED (light emitting diode) display 88 which shows that at least one call has been received or by incrementing a counter 90 to show how many calls have been received and thus how many messages are awaiting collection. Display unit 86 can also be used to display any pertinent data stored in phone database 84, such as the number 92 and the name 94 of the caller. An audio signal, such as a series of beeps, can also be used to indicate the receipt of the call.

It is not essential for the recipient's computer or modem to be connected to receiving unit 54 in order to receive notification from host computer 50 of messages addressed to him. However, in order to call host computer 50 the recipient uses his personal computer system 18 and thus it is preferable to connect receiving unit 54 to modem 96 and personal computer (PC) 98.

Personal computer 98 can be instructed to contact host computer 50, via modem 96 whenever the caller is identified as being host computer 50 and retrieve stored messages. Thus, provided PC 98 is operative, the recipient can automatically and immediately receive mail destined for him.

In a second embodiment, call intercept unit 82 is a remote receiver, not directly linked to a telephone line, such as a cellular telephone which can intercept the call dialed by dialing unit 52.

In a third embodiment, the recipient can be notified of urgent messages. A separate telephone number is allocated by host computer 50 to dial "urgent" calls. Communications processor 60 of host computer 50 is further able to identify messages marked as "urgent" by the sender. On receipt of a "urgent" call from dialing unit 52, call intercept unit 82 intercepts the call, as hereinabove described and displays the receipt of the "urgent" call on display unit 86.

Figure 3:
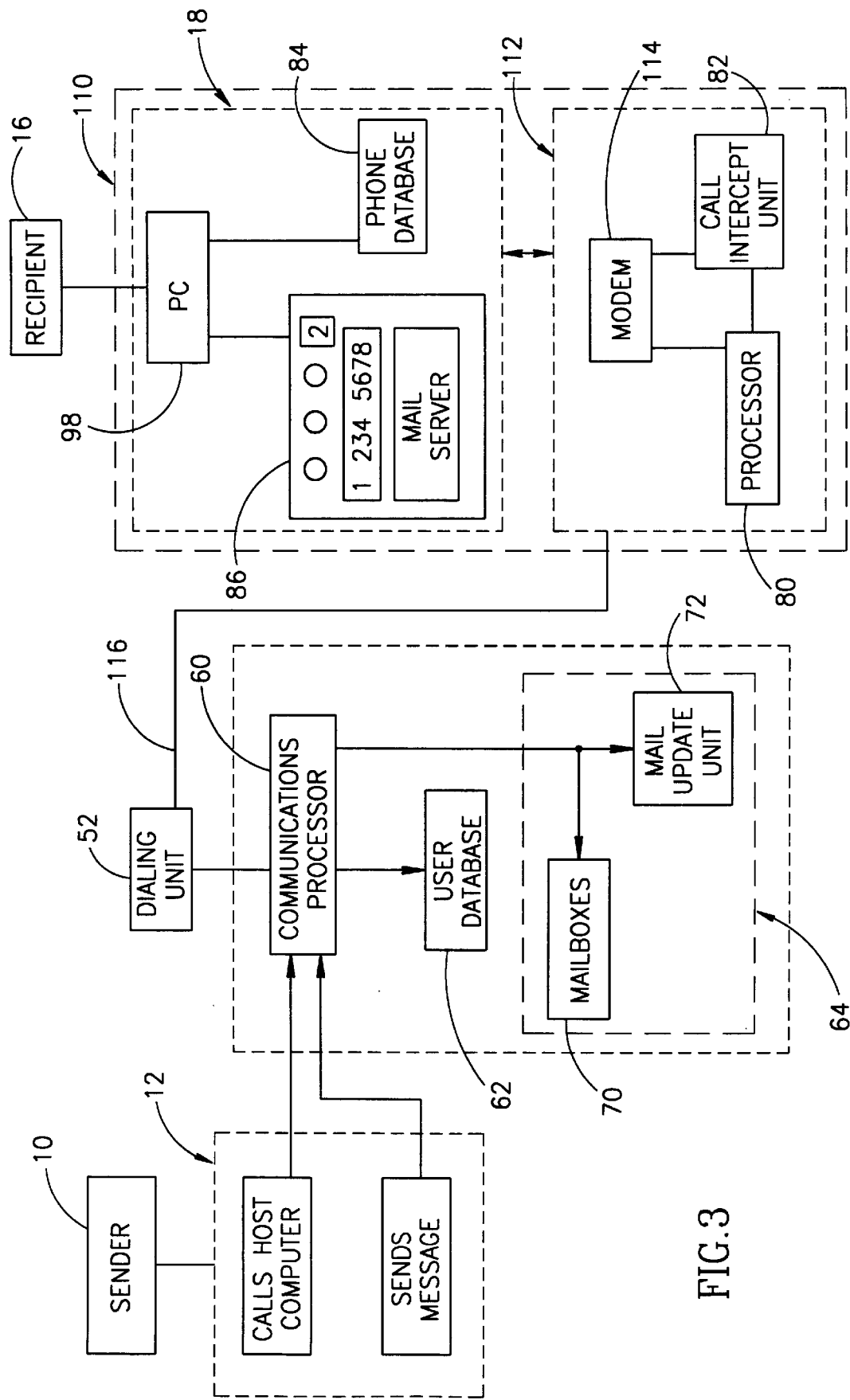
FIG. 3 is a block diagram illustration of an electronic mailing system in accordance with a second embodiment of the present invention.

Reference is now made to FIG. 3 which illustrates electronic mailing system constructive and operative in accordance with a fourth embodiment of the present invention. Elements of this embodiment of the invention which are similar to elements which have been previously described with respect to the preferred embodiment hereinabove, are similarly designated and will not be further described.

Electronic mailing system 40 comprises a dialing unit 52 connected to a host computer 50, as hereinabove described with respect to FIG. 2. Electronic mailing system 40 further comprises a receiving unit 110 remotely situated from dialing unit 52.

Receiving unit 110, such as the "lntellect" unit manufactured by Clearwave Communications of Fort Collins, Colo., United States, is a communications unit which integrates several different communications functions. For example, the unit can be used as a telephone, facsimile, modem, a telephone answering machine and to receive voice mail. In combination with a specific software package, receiving unit 110 can also be used as an call intercept unit to intercept telephone calls and as a standard modem to dial out and receive mail messages, for example.

Receiving unit 110 comprises a modem communicator unit, generally designated 112, connected to the recipient's computer system 18. Modem communicator unit 112 comprises a modem 114 connected to a processor 80 and to a call intercept unit 82. Call intercept unit 82 is a component of modem 114. Communicator unit 112 is connected to a telephone line, designated 116.

The recipient's computer system 18 comprises a personal computer 98, connected to a display unit 86. Personal computer 98 contains the recipient's phone database 84.

In operation, when dialing unit 52 dials the recipient's associated telephone number, call intercept unit 82 of modem 114, intercepts the call, as previously described with respect to the embodiment of FIG. 2. The data from the intercepted call is passed to PC 98 which processes the information. An indication that dialing unit 52 has called can be displayed on display unit 86, as previously described with respect to the embodiment of FIG. 2.

Similar to the previously described embodiment of FIG. 2, personal computer 98 can be instructed to contact host computer 50, via modem 114 whenever the caller is identified as being host computer 50 and retrieve stored messages.

Figure 1:
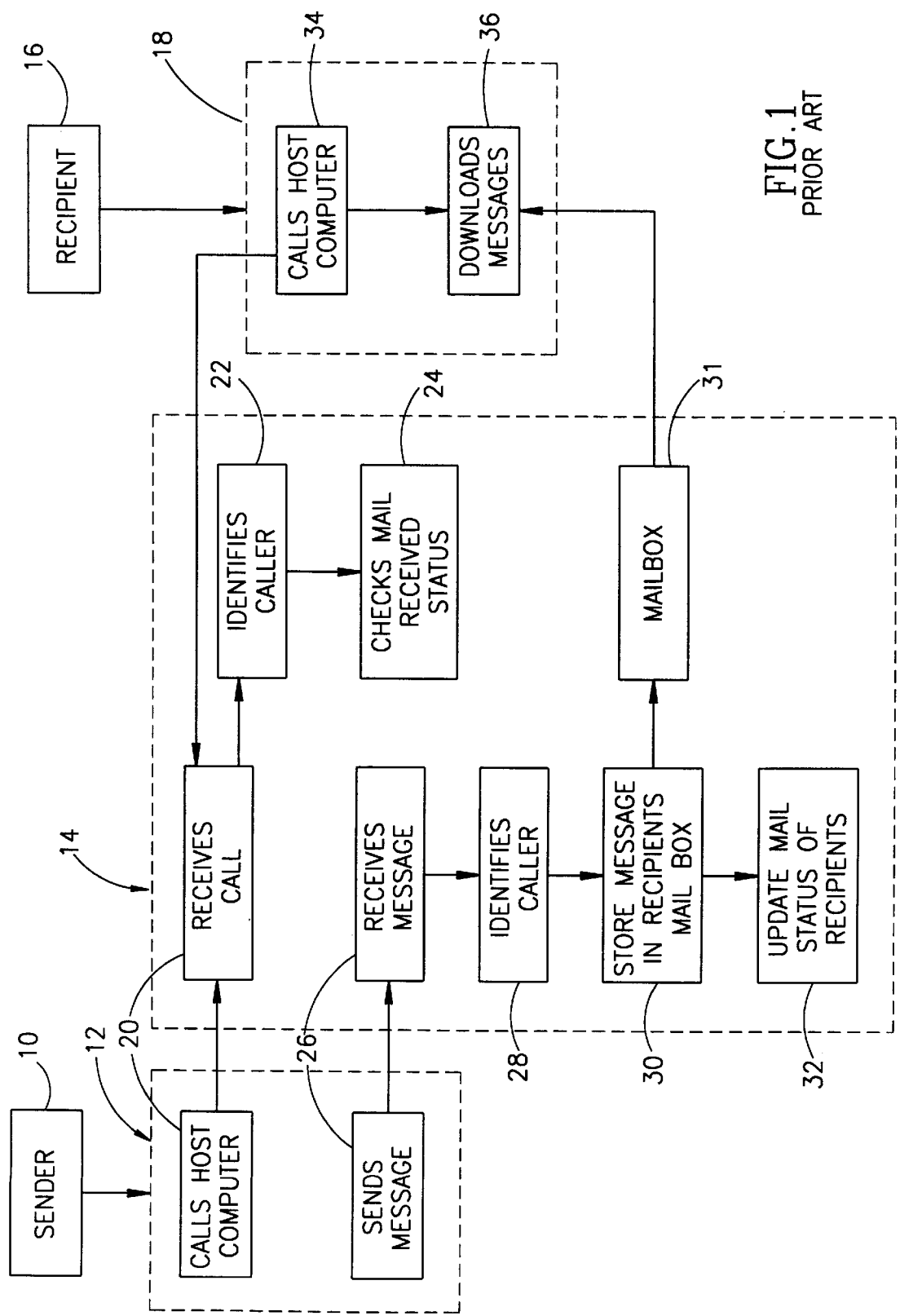
FIG. 1 is a flow chart and block diagram illustration of a prior art electronic mailing system.
Figure 4:
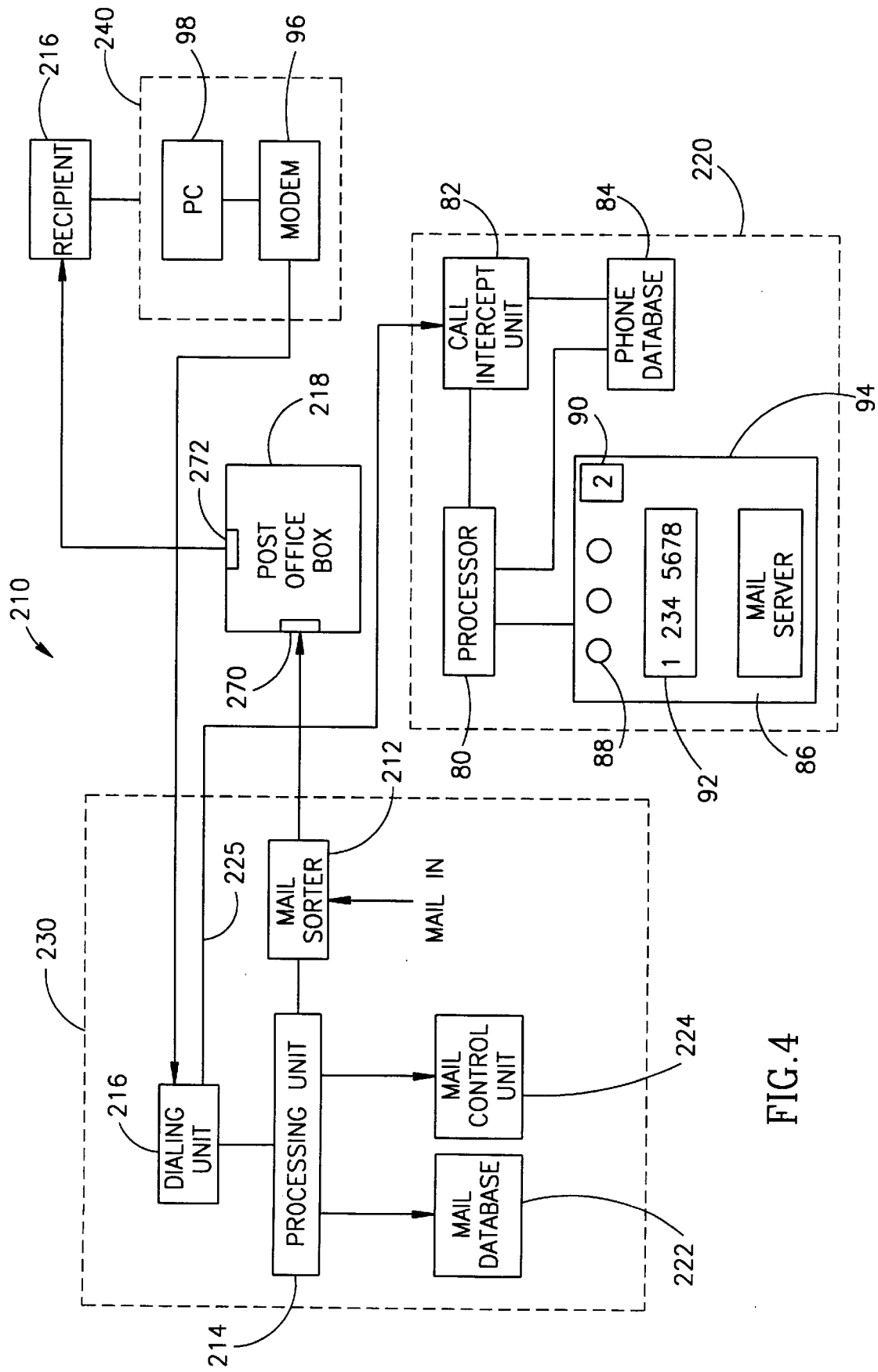
FIG. 4 is a block diagram illustration of a mail notification system in accordance with a preferred embodiment of the present invention.

Reference is now made to FIG. 4 which illustrates a mail notification system, generally designated 210, constructed and operative in accordance with a preferred embodiment of the invention. Elements having similar functions to the embodiments of FIGS. 1–3 are designated with the same reference number.

Mail notification system 210 comprises a mail sorter 212 connected to a processing unit 214, a dialing unit 216, a plurality of Post Office Boxes (POBs) 218 and a receiving unit, generally designated 220. Mail sorter 212, processing unit 214 and dialing unit 216 are commonly located at a main postal distribution center 230. POBs 218 are generally located at any central site which is convenient for the POB user, such as a shopping mall, commercial center or adjacent to the main postal distribution center 230. Receiving unit 220 is generally located at a remote location from main postal distribution center 230.

All mail arriving at the main postal distribution center is sorted by mail sorter 212 which scans the mail to identify the addressee and then sorts and distributes the mail to the correct destination. When mail is identified for an addressee having a POB number, the mail is directed to the relevant POB 218 and processing unit 214 is alerted to dial, via dialing unit 216, the telephone number associated with the addressee. The call may be sent via the public telephone network, shown by line 225. Receiving unit 220 is attached to the POB's telephone line and comprises a call intercept unit 82, described hereinabove, with respect to FIGS. 2–3, which intercepts the call made by dialing unit 216 and identifies the caller. Receiving unit 220 can also be configured to display an indication that main postal distribution center 320 has called.

Receiving unit 220 only needs to be connected to the public telephone network, and does not need to be connected to a computer and modem, in order for the POB user to receive notifications from the main postal distribution center 230 that mail messages have been deposited in his POB and are awaiting collection. Furthermore, the POB user does not have to initiate a call to the main postal distribution center 230 in order to check whether any mail has arrived.

Mail sorter 212 is any known in the art sorter which, for example, comprises an optical scanner or bar-code reader to 'read' mail and in accordance with pre-determined criteria sorts, classifies and distributes the mail.

It will be appreciated that, though reference has been made to mail sorting by machines, the incoming mail may be sorted and classified by a person prior to being inserted into its correct box.

Mail notification system 210 further comprises a mail database 222 and a mail control unit 224 which are connected to processing unit 214. Mail database 222 contains data, such as details of the names, addresses and telephone numbers of addressees in the postal distribution area. Mail control unit 224 registers and updates the status of mail received and collected for each POB user.

Processing unit 214, which is any commercially available processor used in computer systems, processes all mail operations at the main postal distribution center 218. Processing unit 214 receives address information from mail sorter 212 and identifies the addressee by reference to the data contained within mail database 222. Processing unit 214 extracts the addressee's telephone number from database 222 and passes the information onto dialing unit 216. Processing unit 214 also advises mail control unit 224 whenever mail is received for POB users.

Received mail is stored in the addressee's POB 218 which is one of the plurality of post office boxes. A separate POB is allocated to each subscriber.

Receiving unit 220 comprises a processor 80, a call intercept unit 82, a phone database 84 and a display unit 86. Receiving unit 220 is similar to the embodiments described hereinabove with respect to FIGS. 1–3.

Processor 80 controls the operation of receiving unit 220. Call intercept unit 82 intercepts the call made by dialing unit 216 and searches phone database 84 to identify the caller. Phone database 84 contains data, such as details of the name and address of the calling phone, entered by the POB user or the post office to identify the calling phone.

Receiving unit 220, which is connected telephone line 225, may also be connected to the addressee's computer system 240. The addressee's computer system 240 comprises a modem 96 connected to a computer, such as a personal computer (PC) 98. Modem 96, of a type known in the art, is connected to any telephone line and can also be connected to receiving unit 220, if desired.

A POB user can optionally use his PC 98 and modem 96 to communicate with the main postal distribution center 230 to check whether any mail has been received. On receipt of a call from the POB user, mail control unit 224 checks and informs the subscriber accordingly.

Call intercept unit 82, described hereinabove with respect to FIGS. 1–3, can be any type known in the art, such as the "Call Editor II" unit manufactured by VIVE Synergies Inc. of Ontario, Canada, or "Caller ID Adapter" manufactured by Rochelle Communications Inc. of Austin, Tex.

Figure 5:
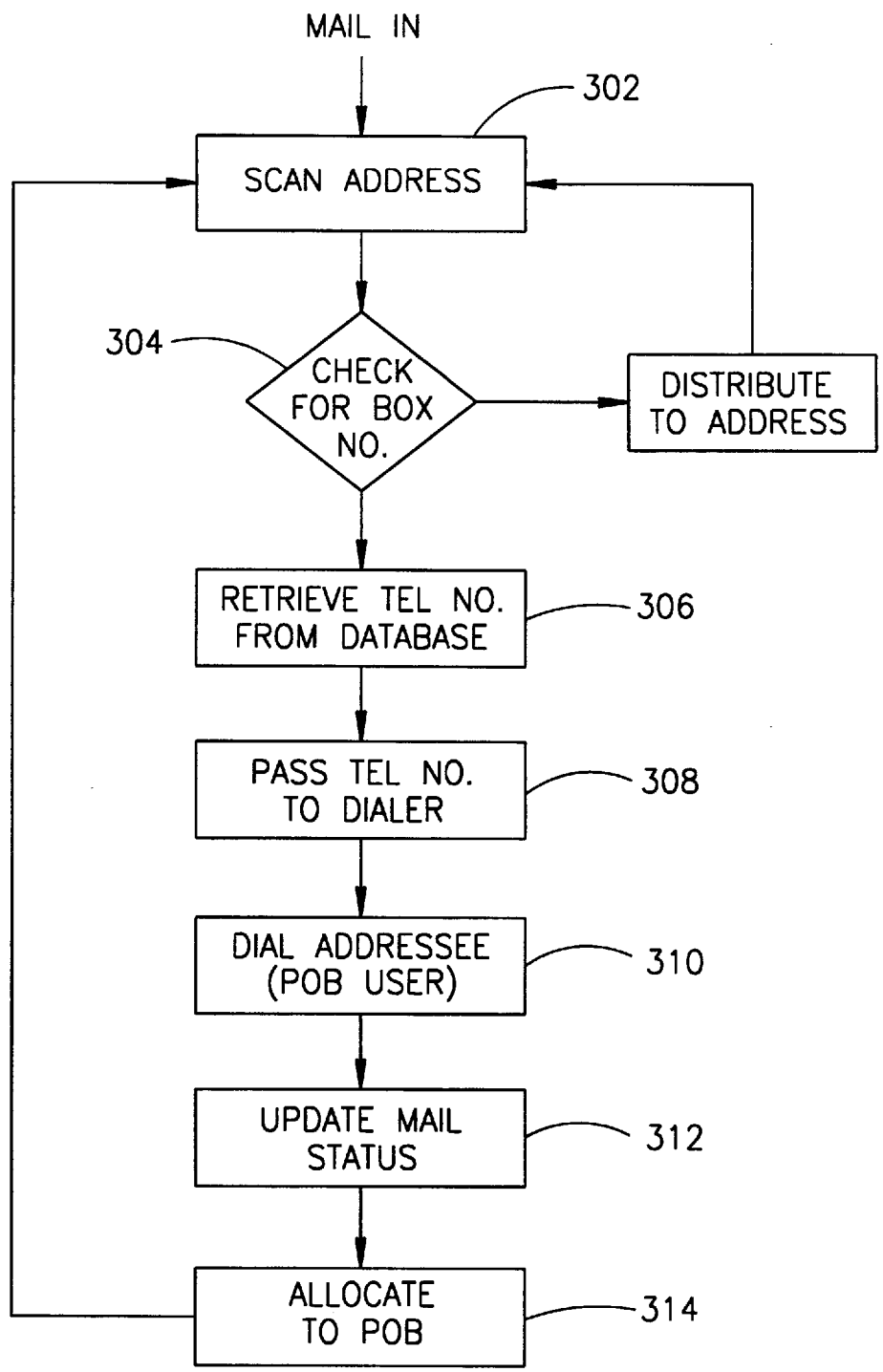
FIG. 5 is a flow chart illustration of the operation of notifying a POB user that mail awaits collection.

Reference is now made to FIG. 5 which is a flow chart illustration of the operation of notifying a POB user that mail awaits collection.

Mail arriving at the main postal distribution center 218 is sorted by mail sorter 212 which scans the addresses of the incoming mail (step 302). The scanned addresses are passed on to processing unit 214 which checks whether the address includes a box number (step 304). If a box number is included, processing unit 214 retrieves details of the addressee's associated telephone number from mail database 222 (step 306) and passes the information on to dialing unit 216 (step 308). Dialing unit 216 then dials the addressee's associated phone number (step 310). Mail control unit 224 updates the status of mail received (step 312). The mail is allocated to the appropriate box (step 314) and the process repeated.

In a further embodiment, call intercept unit 82 is not directly linked to a telephone line, but communicates via a cellular telephone so as to intercept the call dialed by dialing unit 216.

In a yet further embodiment (FIG. 4), a suitable sensing device 270, commercially available and known in the art, can be attached to each of the plurality of POBs. Sensing devices 270 can be connected to processing unit 214 either directly or alternatively and can communicate with processing unit 214 via a suitable commercially available transmitting device 272. In this case, each time mail is inserted into, or collected from, POB 218, sensor 270 sends a signal to processing unit 214. Processing unit 214 is programmed to identify the POB from the sensor signal.

As hereinabove described, processing unit 214 extracts the addressee's telephone number from database 222 and passes the information onto dialing unit 216. Processing unit 214 also advises mail control unit 224 whenever mail is received for POB users.

A second sensor 272 can be attached close to the outlet of POB 218 and similar to sensing device 270 can be connected to processing unit 214 so as to communicate with processing unit 214. Each time mail is removed from POB 218, sensor 272 registers the fact and sends a signal to mail control unit 224 via processing unit 214.

Figure 6:
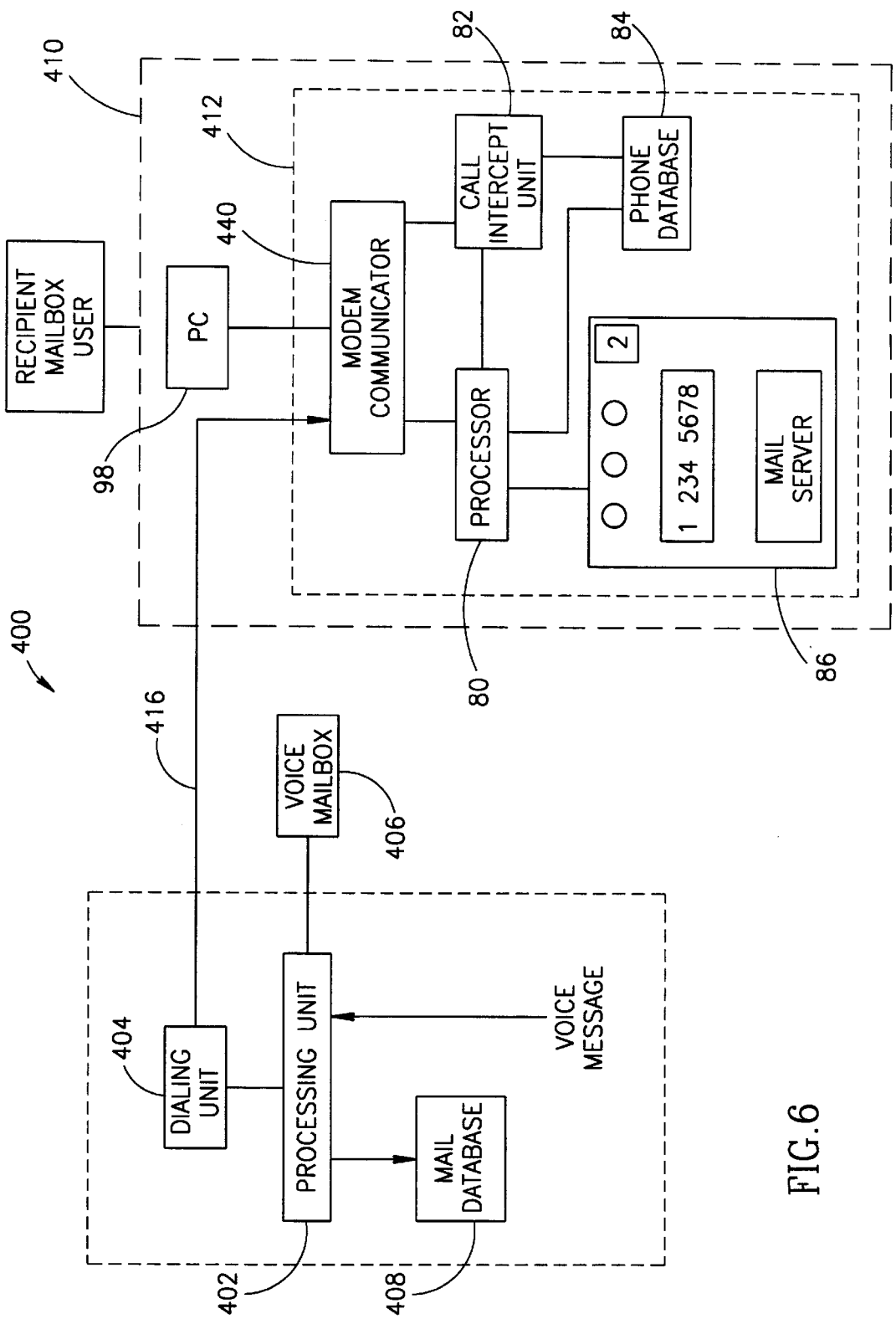
FIG. 6 is a block diagram illustration of an mail notification system in accordance with a further embodiment of the present invention.

Reference is now made to FIG. 6 which illustrates a mail notification system constructive and operative in accordance with a further embodiment of the present invention. Elements of this embodiment of the invention which are similar to elements which have been previously described with respect to the preferred embodiment hereinabove, are similarly designated and will not be further described.

Mail notification system generally designated 400, comprises a voice mail processing unit 402, a dialing unit 404, a plurality of Voice Mail Boxes (VMBs) 406, a voice mail database 408, and a receiving unit, generally designated 410.

Voice mail processing unit 402 is any voice mail processing system known in the art, which is operable to communicate through the telephone network. Calls may be answered automatically, for example, and the caller may be provided with a plurality of options for passing on messages. Voice mail database 408 contains data, such as details of the names, addresses and telephone numbers, related to each of the subscribers using one of the plurality of VMBs 406 associated with the mail notification system 400. Dialing unit 404 is similar to dialing unit 216 described hereinabove with respect to FIG. 4.

Voice messages received from a calling party are processed by voice mail processing unit 402 which identifies the destination for the incoming call by reference to the voice mail database 408 and stores the message in the respective VMB 406.

Voice mail processing unit 402 abstracts the telephone number associated with the VMB 406 and dials the VMB user via dialing unit 404, as hereinabove described with respect to FIG. 4.

Receiving unit 410, which is similar to receiving unit 110 described hereinabove with respect to FIG. 3, is a communications unit such as the "Intellect" unit manufactured by Clearwave Communications of Fort Collins, Colo., United States.

Receiving unit 410 comprises a modem communication unit, generally designated 412, connected to the mailbox user's computer system 218. Modem communication unit 412 comprises a modem 414 connected to a processor 80 and to a call intercept unit 82. Modem communicator 440 is connected to a telephone line, designated 416.

Optionally, the mailbox user's computer system 240 comprises a personal computer 98, connected to a display unit 86. Personal computer 98 contains the addressee's phone database 84.

In operation, an incoming call is processed by voice mail processing unit 402. Depending on the type of voice mail processing unit 402 being used the interface available and the information input by the caller, voice mail processing unit 402 processes the incoming call. Generally, voice mail processing unit 402 references voice mail database 408 in order to identify the destination for the incoming call and stores the message in the respective VMB 406.

Dialing unit 404 dials the addressee's associated telephone number and call intercept unit 82 of modem communicator 210, intercepts the call, as previously described with respect to the embodiment of FIG. 4. The data from the intercepted call is passed to PC 98 which processes the information. An indication that dialing unit 404 has called can be displayed on display unit 86, as previously described with respect to the embodiment of FIG. 4.

As will be appreciated by persons knowledgeable in the art, the various embodiments hereinabove referred are given by way of example only and do not in any way limit the present invention.

Those skilled in the art will be readily appreciate that various changes, modifications and variations may be applied to the preferred embodiments without departing from the scope of the invention as defined in and by the appended claims.

I claim:

1. An electronic mailing system having at last a main host computer, for transferring mail between a sending subscriber and a recipient subscriber, said sending subscriber and said recipient subscriber not being continually connected to each other or to said host computer, comprising:
   a. a dialing unit connected to said host computer for calling a telephone number associated with said recipient subscriber whenever a mail message for said recipient subscriber arrives at the host computer;
   b. a receiving unit comprising a call intercept unit associated with the recipient subscriber's telephone, for intercepting said telephone call from said dialing unit, identifying it as a telephone call from said dialing unit and providing an indication that said dialing unit has called said call intercept unit without requiring completion of said call; and
   c. a display unit for displaying said indication that said dialing unit has called said call intercept unit, thereby indicating arrival of a mail message at said host computer.

2. An electronic mailing system according to claim 1 wherein said receiving unit further comprises a phone database for storing details associated with each of said calling telephone numbers.

3. An electronic mailing system according to claim 1 wherein said display unit comprises an incrementing counter for displaying the number of calls received.

4. An electronic mailing system according to claim 1 wherein said display unit comprises a alphanumeric display.

5. An electronic mailing system according to claim 1 wherein said display unit comprises a light emitting diode display.

6. An electronic mailing system according to claim 1 wherein said call intercept unit is a paging receiver not directly connected to said recipient subscriber's telephone.

7. An electronic mailing system according to claim 1 wherein said call intercept unit comprises processing means for processing data sent by the telephone network.

8. An electronic mailing system according to claim 1 wherein said host computer comprises:
   a. a communications processor for processing information communicated to said host computer;
   b. a user database for storing details of subscribers to said host computer; and
   c. a mail control unit for processing mail messages communicated to said host computer.

9. An electronic mailing system according to claim 8 wherein said mail control unit comprises:
   a. a plurality of mailboxes for storing of said received mail messages, each of said plurality of mailboxes allocated to one of said subscribers; and
   b. a mail update unit for registering and updating the status of one of said mailboxes whenever a mail message is received or collected from said mailbox.

10. An electronic mailing system according to claim 1 wherein said call intercept unit is a remote receiver.

11. An electronic mailing system having at last a main host computer, for transferring mail between a sending subscriber and a recipient subscriber, said sending subscriber and said recipient subscriber not being continually connected to each other or to said host computer, comprising:
    a. a dialing unit connected to said host computer for calling a telephone number associated with said recipient subscriber whenever a mail message for said recipient subscriber arrives at the host computer;
    b. a receiving unit comprising a modem communicator associated with the recipient subscriber's telephone, for receiving said telephone call from said dialing unit, identifying it as a telephone call from said dialing unit and providing an indication that said dialing unit has called said receiving unit without requiring completion of said call; and
    c. a computer system comprising a display unit for displaying said indication that said dialing unit has called said receiving unit, thereby indicating arrival of a mail message at said host computer.

12. An electronic mailing system according to claim 11 wherein said modem communicator comprises a call intercept unit, for intercepting said telephone call from said dialing unit.

13. An electronic mailing system according to claim 11 wherein said receiving unit further comprises a phone database for storing details associated with each of said calling telephone numbers.

14. An electronic mailing system according to claim 11 wherein said display unit comprises an incrementing counter for displaying the number of calls received.

15. An electronic mailing system according to claim 11 wherein said display unit comprises a alphanumeric display.

16. An electronic mailing system according to claim 11 wherein said display unit comprises a light emitting diode display.

17. An electronic mailing system according to claim 11 wherein said call intercept unit comprises processing means for processing data sent by the telephone network.

18. A mail notification system for notifying an addressee that mail has been deposited in an addressee mailbox, the system comprising:

a. a processing unit for processing mail operations;
b. a dialing unit connected to said processing unit for calling a telephone number associated with said recipient subscriber whenever mail is deposited in said addressee subscriber's mailbox;
c. a receiving unit comprising a call intercept unit associated with the recipient subscriber's telephone, for intercepting said telephone call from said dialing unit identifying it as a telephone call from said dialing unit and providing an indication that said dialing unit has called said call intercept unit without requiring completion of said call; and
c. a display unit for displaying said indication that said dialing unit has called said call intercept unit, thereby indicating that mail has been deposited in said addressee subscriber's mailbox.

19. A mail notification system according to claim 18 further comprising a mail sorter, connected to said processing unit, for identifying and classifying mail addressed to said addressee subscriber.

20. A mail notification system for notifying an addressee subscriber that mail has been deposited in an addressee subscriber's mailbox, the system comprising:
a. a processing unit for processing mail operations;
b. a sensing device, connected to said addressee subscriber's mailbox and said processing unit, for sensing whenever mail is deposited in or removed from said addressee subscriber's mailbox;
c. a dialing unit connected to said processing unit for calling a telephone number associated with said addressee subscriber whenever mail is deposited in said addressee subscriber's mailbox;
d. a receiving unit comprising a call intercept unit associated with the recipient subscriber's telephone, for intercepting said telephone call, identifying it as a telephone call from said dialing unit and providing an indication that said dialing unit has called said call intercept unit without requiring completion of said call; and
e. a display unit for displaying said indication that said dialing unit has called said call intercept unit, thereby indicating that mail has been deposited in said addressee subscriber's mailbox.

21. A mail notification system according to claim 18 further comprising:
a. a user database for storing details of mailbox subscribers; and
b. a mail control unit for registering and updating the status of one of said mailboxes whenever mail is received or collected from said mailbox.

22. A mail notification system according to claim 18 wherein said mail is postal mail.

23. A mail notification system according to claim 18 wherein said mail is voice mail.

24. A mail notification system according to claim 18 wherein said receiving unit further comprises a phone database for storing details associated with each of said calling telephone numbers.

25. A mail notification system according to claim 18 wherein said display unit comprises an incrementing counter for displaying the number of calls received.

26. A mail notification system according to claim 18 wherein said display unit comprises an alphanumeric display.

27. A mail notification system according to claim 18 wherein said display unit comprises a light emitting diode display.

28. A mail notification system according to claim 18 wherein said call intercept unit is a paging receiver not directly connected to said addressee subscriber's telephone.

29. A mail notification system according to claim 18 wherein said call intercept unit comprises processing means for processing data sent by the telephone network.

30. A mail notification system according to claim 18 wherein said call intercept unit is a remote receiver.

31. A mail notification system for notifying an addressee subscriber that mail has been deposited in said addressee subscriber's mail box, comprising:
a. a processing unit for processing incoming mail;
b. a dialing unit connected to said processing unit for calling a telephone number associated with said addressee subscriber whenever mail is deposited in said addressee subscriber's mail box;
c. a receiving unit comprising a modem communicator associated with the addressee subscriber's telephone, for receiving said telephone call from said dialing unit, identifying it as a telephone call from said dialing unit and providing an indication that said dialing unit has called said receiving unit without requiring completion of said call; and
d. a computer system comprising a display unit for displaying said indication that said dialing unit has called said receiving unit, thereby indicating that mail has been deposited in said addressee subscriber's mail box.

32. A mail notification system according to claim 31 wherein said modem communicator comprises a call intercept unit, for intercepting said telephone call from said dialing unit.

33. A mail notification system according to claim 31 wherein said receiving unit further comprises a phone database for storing details associated with each of said calling telephone numbers.

34. A mail notification system according to claim 31 wherein said display unit comprises an incrementing counter for displaying the number of calls received.

35. A mail notification system according to claim 31 wherein said display unit comprises a alphanumeric display.

36. A mail notification system according to claim 31 wherein said display unit comprises a light emitting diode display.

37. A mail notification system according to claim 31 wherein said call intercept unit comprises processing means for processing data sent by the telephone network.

38. A mail notification system according to claim 31 wherein said mail is postal mail.

39. A mail notification system according to claim 31 wherein said mail is voice mail.

40. A method for notifying a subscriber that mail has been deposited in said subscriber's mailbox, comprising the steps of:
a. processing incoming mail;
b. depositing mail addressed to said subscriber in said subscriber's mailbox;
c. dialing a telephone number associated with said subscriber whenever mail is deposited in said addressee subscriber's mail box;
d. intercepting a dialed call by means of an unit associated with said subscriber's telephone;
e. identifying said dialed call as a telephone call from said dialing unit and providing an indication that said dialing unit has called said receiving unit without requiring completion of said call; and f. displaying said indication that said dialed call has been intercepted, thereby indicating that mail has been deposited in said subscriber's mailbox.

41. A method according to claim 40 wherein said step of processing comprises the step of sorting said incoming mail by identifying and classifying said mail.

42. A method according to claim 40 and further comprising the step of sensing whenever there is a change in the amount mail deposited in said subscriber's mailbox.

43. A method according to claim 40 and further comprising the step of registering and updating the status of said subscriber's mailbox whenever a change is made in the amount of mail deposited in said subscriber's mailbox.

44. A method according to claim 40 wherein said step of intercepting comprises the step of identifying said dialled call from a database storing details of telephone numbers.

45. A method according to claim 40 wherein said step of intercepting comprises the step of processing data sent by the telephone network.

46. A method according to claim 40 wherein said step of displaying comprises the step of displaying the number of calls received.

47. A method for transferring mail between a sensing subscriber and a recipient subscriber via a host computer, said sending subscriber and said recipient subscriber not being continually connected to each other or to said host computer, said method comprising the steps of:

a. dialing a telephone number associated with said recipient subscriber whenever a mail message for said recipient subscriber arrives at said host computer;

b. intercepting a dialed telephone call by means of an unit associated with said subscriber's telephone;

c. identifying said dialed call as a telephone call from said dialing unit and providing an indication that said dialing unit has called said receiving unit without requiring completion of said call; and d. displaying said indication that said dialed call has been intercepted, thereby indicating that a mail message for said recipient subscriber arrives at said host computer.

48. A method for transferring mail according to claim 47 wherein said step of intercepting comprises the step of identifying said dialled call from a database storing details of telephone numbers.

49. A method for transferring mail according to claim 47 wherein said step of intercepting comprises the step of processing data sent by the telephone network.

50. A method for transferring mail according to claim 47 further comprising the steps of:

a. storing received messages within one of a plurality of mailboxes; and b. registering and updating the status of mail messages received or collected from said mailboxes.

51. A method for transferring mail according to claim 47 wherein said step of displaying comprises the step of displaying the number of calls received.

52. A method for transferring mail according to claim 47 wherein said step of displaying comprises the step of displaying the telephone number of the caller.

53. A method for notifying a subscriber that mail has been deposited in said subscriber's mailbox according to claim 40 wherein said step of displaying comprises the step of displaying the telephone number of the caller.

54. An electronic mailing system according to claim 1 wherein said display unit comprises a display for displaying the telephone number of the dialing unit, thereby indicating arrival of a mail message at said host computer.

55. An electronic mailing system according to claim 11 wherein said display unit comprises a display for displaying the telephone number of the dialing unit, thereby indicating arrival of a mail message at said host computer.

56. A mail notification system according to claim 20 wherein said display unit comprises a display for displaying the telephone number of the dialing unit, thereby indicating arrival of mail at said addressee subscriber's mailbox.

57. A mail notification system according to claim 31 wherein said display unit comprises a display for displaying the telephone number of the dialing unit, thereby indicating arrival of mail at said subscriber's mailbox.

\* \* \* \* \*